United States Patent [19]

Kohiyama et al.

[11] Patent Number: 5,043,799
[45] Date of Patent: Aug. 27, 1991

[54] COLOR IMAGE DISPLAY CONTROL APPARATUS WITH CORRECTION OF PHASE DIFFERENCE IN SAMPLING CLOCK

[75] Inventors: Kiyoshi Kohiyama, Tokyo; Shozo Kobatake, Kawasaki; Hidenaga Takahashi, Tokyo, all of Japan

[73] Assignee: Fujitsu Limited, Kawasaki, Japan

[21] Appl. No.: 369,051

[22] Filed: Jun. 20, 1989

[30] Foreign Application Priority Data

Jun. 20, 1988 [JP] Japan .................. 63-152882

[51] Int. Cl.$^5$ ............................ H04N 9/45
[52] U.S. Cl. .................... 358/19; 358/21 R
[58] Field of Search ............ 358/19, 21 R, 31, 37, 358/28, 23, 140

[56] References Cited

U.S. PATENT DOCUMENTS

| 4,680,632 | 7/1987 | Willis | 358/140 |
| 4,689,664 | 8/1987 | Moring | 358/23 |
| 4,694,326 | 9/1987 | Demmer | 358/23 |

FOREIGN PATENT DOCUMENTS 51387  3/1985  Japan ...................... 358/28

OTHER PUBLICATIONS

T. Kurita et al., "IDTV Apparatus by SCAD System" in the 1987 National Convention Record of the Institute of Television Engineers of Japan, No. 13-3, pp. 309-310.

R. Kobayashi, "IDTV Apparatus by SCAD(Sub-Carrier AD) System" in the 1987 National Convention Record of the Institute of Television Engineers of Japan, No. 13-4, pp. 311-312.

Kiyoyuki Kawai et al., "IDTV Receiver" in the Digest of Technical Papers of the 1987 IEEE International Conference on Consumer Electronics, Session XIII -TV Receiver Design, THPM 13.4, pp. 172-173.

Primary Examiner—Tommy P. Chin
Attorney, Agent, or Firm—Staas & Halsey

[57] ABSTRACT

A color image display control apparatus for receiving a composite color picture signal and processing color image data included in the signal. A color picture signal in an analog form included in the composite color picture signal is converted to a digital form by sampling the analog signal at each cycle of a sampling clock, in and analog to digital converter. The digital image data is processed in a digital image processing circuit. Processed digital data is converted to analog data in a digital to analog converter. Information regarding a phase difference between the sampling clock and each horizontal synchronizing signal in the composite color picture signal is obtained. According to the information, a digital image data in a line corresponding to each horizontal synchronizing signal, which was sampled by the sampling clock, is modified so that the influence of the above phase difference on a displayed image of the processed image data is corrected.

12 Claims, 13 Drawing Sheets

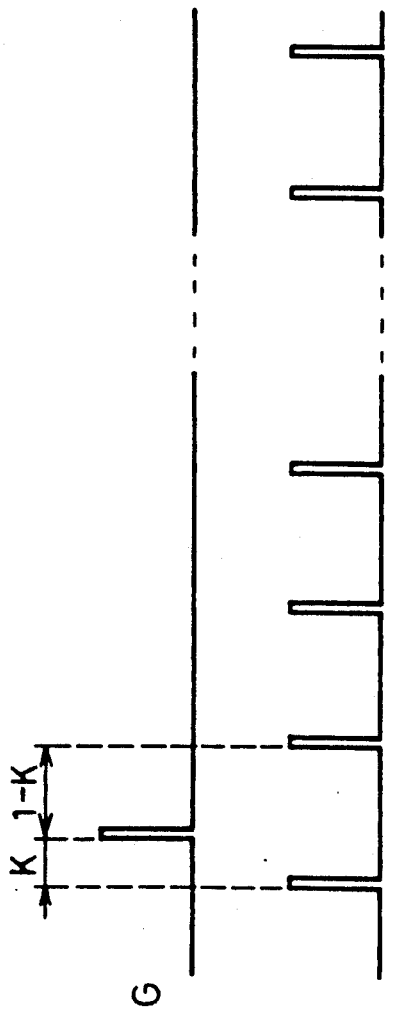
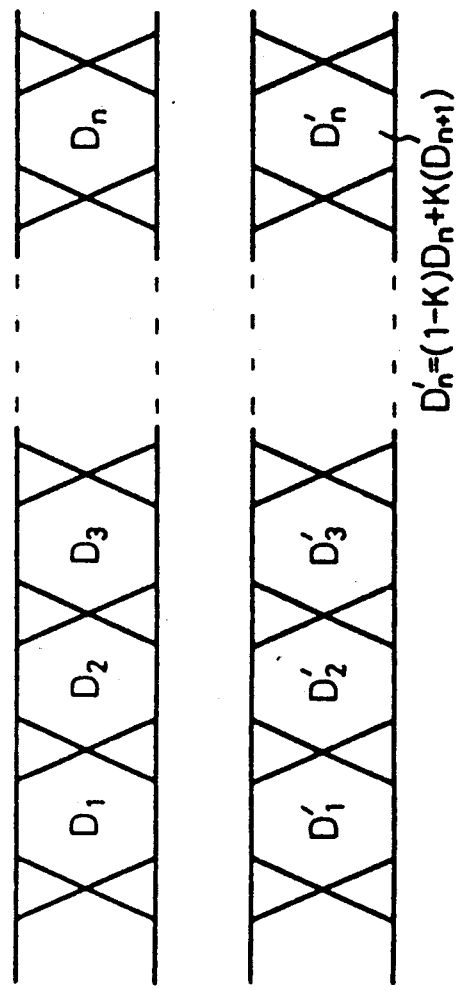
Fig. 6(A) HORIZONTAL SYNCHRONIZING SIGNAL H
Fig. 6(B) SAMPLING CLOCK ($4f_{sc}$)
Fig. 6(C) DATA BEFORE MODIFIED
Fig. 6(D) MODIFIED DATA
$D'_n = (1-K)D_n + K(D_{n+1})$

COLOR IMAGE DISPLAY CONTROL APPARATUS WITH CORRECTION OF PHASE DIFFERENCE IN SAMPLING CLOCK

BACKGROUND OF THE INVENTION (1) Field of the Invention

The present invention relates to a color image display control apparatus for receiving a composite color picture signal and processing color image data included in the signal.

A color image display control apparatus is used for processing an original image included in a composite color picture signal, for example, to improve quality of the image, to superimpose characters, or to insert a small picture area into the original image area, etc.

Owing to recent progress in digital signal processing technology, and to enable image processing by computer control, the image processing is usually carried out in the form of digital data.

(2) Description of the Related Art

FIG. 1 shows an outline of a conventional construction of a color image display control apparatus.

In FIG. 1, reference numeral 1 denotes an analog to digital converter, 2 denotes a Y/C separation circuit, 3 denotes a digital image processing circuit, 4 denotes a matrix circuit, 5 denotes a digital to analog converter, and 6 denotes a display apparatus.

The analog to digital converter 1 converts a color picture signal in an analog form included in a composite color picture signal to a digital form at each cycle of a sampling clock.

The Y/C separation circuit 2 separates a luminance signal Y and color difference signals R−Y and B−Y, or I and Q, from the composite color picture signal, where R denotes a color signal "red", B denotes a color signal "blue" and Y denotes a luminance signal, I denotes an I signal which is defined by $I = -0.27(B-Y) + 0.74(R-Y)$, and Q denotes a Q signal which is defined by $Q = 0.41(B-Y) + 0.48(R-Y)$.

The digital image processing circuit 3 processes digital image data.

The matrix circuit 4 composes color signals from the luminance signal and the color difference signals.

The digital to analog converter 5 converts processed digital image data to an analog form.

The display apparatus 6 displays an image corresponding to the processed image data.

All of the above components are well-known in the field of digital image processing technology.

In the above construction, a conversion of an analog color picture signal included in the composite color picture signal to digital form, processing of the digital image data, and a conversion of the processed digital data to an analog form, are carried out.

A standard composite color picture signal, which conforms to a standard system for television transmission, for example, NTSC system, PAL system, etc., includes vertical and horizontal synchronizing signals, a luminance signal, color signals, and a color burst signal. The color burst signal gives a reference phase for demodulating color signals.

When converting an analog color picture signal to a digital form in color image display control apparatuses, usually, a clock signal having a frequency n (n is an integer) times of the color sub-carrier $f_{sc}$ and synchronized with the color burst signal, is used as a sampling clock.

On the other hand, a position where each sampled data in a horizontal line is displayed, is determined based on the timing of the horizontal synchronizing signal because the scanning of each horizontal line is triggered at the timing of the horizontal synchronizing signal.

Generally, in standard composite color picture signals, for example, the television signals sent from the public broadcasting station, a phase difference between the color burst signal and the horizontal synchronizing signal is a predetermined constant.

However, when a composite color picture signal is played back by a popular video tape recorder or a laser disk recorder which was manufactured for personal use, the phase difference between the color burst signal and the horizontal synchronizing signal is not maintained to be a constant anymore, due to a mechanical inaccuracy of the structure of the video tape recorder or a laser disk recorder for personal use. The inaccuracy is commercially inevitable at present because achieving high mechanical accuracy causes an increase in cost.

Thus, the variation in the phase difference between the color burst signals and the horizontal synchronizing signals, causes a dislocation of image on a horizontal line, and therefore, causes a distortion in the horizontal direction of a displayed image.

FIGS. 2(A) and 2(B) show a variation of phases of sampled image data according to a variation of phase differences between a horizontal synchronizing signal and a sampling clock, which variation results in dislocations of image data in the horizontal direction on a display screen.

In FIGS. 2(A) and 2(B), an original image data on a horizontal line before being sampled is shown on the top.

If a phase difference from a horizontal synchronizing signal is equal to zero in the line A, as shown in FIG. 2(A), when the above original image data shown in the top is sampled by the sampling clock, the sampled image data "A" is obtained.

If a phase difference from a horizontal synchronizing signal is equal to θ in the line "B", as shown in FIG. 2(B), when the same original image data shown in the top is sampled by the sampling clock, the sampled image data "B" is obtained.

As shown FIGS. 2(A) and 2(B), when a phase difference between the horizontal synchronizing signal and a sampling clock varies, the phase of the sampled image data on the horizontal line varies accordingly.

FIG. 3 illustrates the distortion of the image caused by the above difference between the horizontal synchronizing signal and the sampling clock shown in FIGS. 2(A) and 2(B). As explained above, the distortion originates from the difference between the horizontal synchronizing signal and the color burst signal.

Typically, the cycle time $1/f_{sc}$ of the color burst signal is about 280 nsec, the cycle time ($\frac{1}{4}f_{sc}$ when a sampling clock having a frequency $4f_{sc}$ is used) of the sampling clock is about 70 nsec, and the typical range of the variation of the phase difference between the horizontal synchronizing signal and the color burst signal is about 10 to 20 nsec. The distortion in the horizontal direction (shown by "d" in FIG. 3) due to the variation of the phase difference about 10 to 20 nsec, amounts to about a few millimeters. This amount of distortion is well visible and greatly deteriorates the displayed image.

In the prior art, some attempts have been carried out to solve the above problem.

In the attempts in the prior art (T. Kurita et al., "IDTV apparatus by SCAD system" in the 1989 National Convention Record of the Institute of Television Engineers of Japan, pp 309-310, No. 13-3, R. Kobayashi, "IDTV apparatus by SCAD (sub-carrier A/D) system" in 1989 National Convention Record of the Institute of Television Engineers of Japan, pp 311-312, No. 13-4), first, it is determined whether a received signal is a standard composite color picture signal wherein a phase difference between the color burst signal and the horizontal synchronizing signal is a predetermined constant, or non-standard composite color picture signal wherein a phase difference between the color burst signal and the horizontal synchronizing signal varies. Next, if the signal is a standard composite color picture signal, the color image display control apparatus is operated with a system clock synchronized with the color burst signal. Or if the signal is a non-standard composite color picture signal, the color image display control apparatus is operated with a system clock synchronized with the horizontal synchronizing signal.

However, in the above attempts, a circuit for detecting the standard/non-standard composite color picture signals, additional constructions including, for example, a circuit for generating a sampling clock synchronized with the horizontal synchronizing signal, a digital circuit for demodulating color signals operating by the sampling clock synchronized with the horizontal synchronizing signal, or an analog circuit for demodulating color signals which operates regardless of sampling clock, etc. must be provided. Therefore, the above attempt greatly increased the scale of the circuits.

Further, when a circuit operating with a sampling (system) clock and another circuit operating with another sampling (system) clock are incorporated in a system, an interference between the two different system clocks, which causes harmful noises, occurs.

SUMMARY OF THE INVENTION

An object of the present invention is to provide a color image display control apparatus wherein a distortion in the horizontal direction of a displayed image due to a varying phase difference between a horizontal synchronizing signal and a color burst signal in a non-standard composite color picture signal, can be corrected, and both standard and non-standard composite color picture signals can be equally processed in one system without large increase in the scale of the circuit, or an interference between the two different system clocks.

According to the present invention, there is provided a color image display control apparatus for receiving a composite color picture signal and processing color image data included in the signal, comprising: an analog to digital converter for converting a color picture signal in an analog form included in the composite color picture signal to a digital form by sampling the analog signal at each cycle of a sampling clock; a digital image processing means for processing digital image data; a digital to analog converter for converting processed digital image data to an analog form; a phase difference information outputting means for outputting information regarding a phase difference between the sampling clock and each horizontal synchronizing signal in the composite color picture signal; and a digital data modifying means for modifying the digital image data in a line corresponding to each horizontal synchronizing signal, which was sampled by the sampling clock, according to the above information, so that a visible distortion in an image of the above processed data due to the above phase difference is corrected.

BRIEF DESCRIPTION OF THE DRAWINGS

In the drawings:

FIGS. 6(A) and 6(B) show examples of a concrete construction realizing a digital PLL circuit generating a phase-locked horizontal synchronizing signal and a ratio of the phase difference and a cycle time of a sampling clock;

DESCRIPTION OF THE PREFERRED EMBODIMENTS

Before describing the preferred embodiment of the present invention, first, the basic principle of the present invention is explained below.

As described in the summary of the invention, in a color image display control apparatus according to the present invention, information regarding a phase difference between the sampling clock and each horizontal synchronizing signal in the composite color picture signal is output by a phase difference information outputting means. Then, the digital image data in a line corresponding to each horizontal synchronizing signal, which was sampled by the sampling clock, is modified according to the above information so that a visible distortion in an image of the above processed data due to the above phase difference is corrected, by a digital data modifying means.

In the embodiment of the present invention, the operation of the above digital data modifying means is carried out by replacing digital image data which was sampled at each cycle of the sampling clock, with a value obtained by a weighted average of the digital image data at its own cycle and digital image data at neighboring cycles, according to the above information.

Further, in the embodiment of the present invention, a ratio of the above phase difference to a cycle time of the sampling clock is used as a weight for the digital image data at the above neighboring cycles in the above weighted average operation.

More specifically, in the preferred embodiment of the present invention, the operation of the above digital data modifying means is carried out by replacing digital image data which was sampled at each cycle of the sampling clock, with a value obtained by a weighted average of the digital image data at its own cycle and digital image data at an adjacent cycle, according to the above information. Further, a ratio of the above phase difference to a cycle time of the sampling clock is used as a weight for the digital image data at the above adjacent cycle in the above weighted average operation.

Hereinafter, details of the above-mentioned characteristic features of the present invention are explained with the concrete construction of the present invention.

Figure 4:
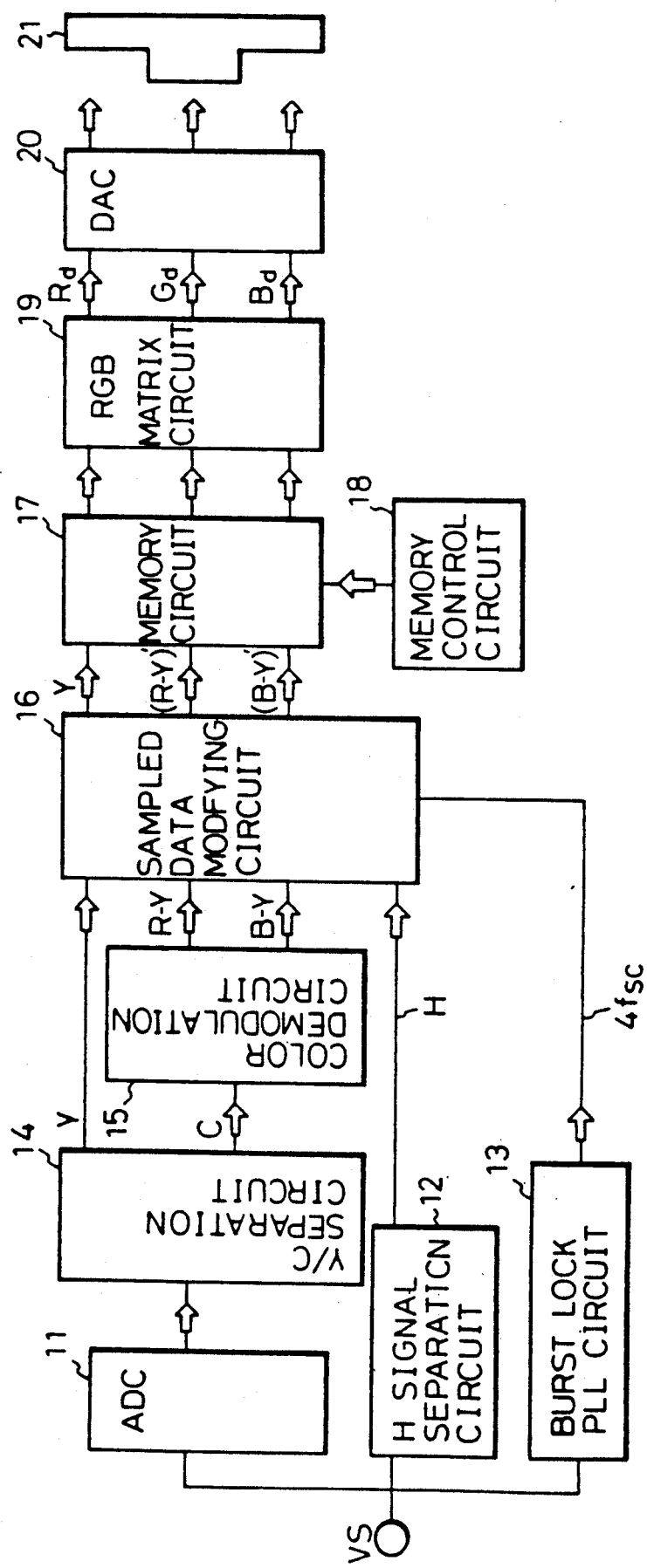
FIG. 4 shows a main construction of an embodiment of the present invention.

FIG. 4 shows a main construction of an embodiment of the present invention.

In FIG. 4, reference numeral 11 denotes an analog to digital converter, 12 denotes a horizontal synchronizing signal separation circuit, 13 denotes a burst lock PLL circuit, 14 denotes a Y/C separation circuit, 15 denotes a color demodulation circuit, 16 denotes a sampled data modifying circuit, 17 denotes a memory circuit, 18 denotes a memory control circuit, 19 denotes an RGB matrix circuit, 20 denotes a digital to analog converter, and 21 denotes a display apparatus.

Figure 1:
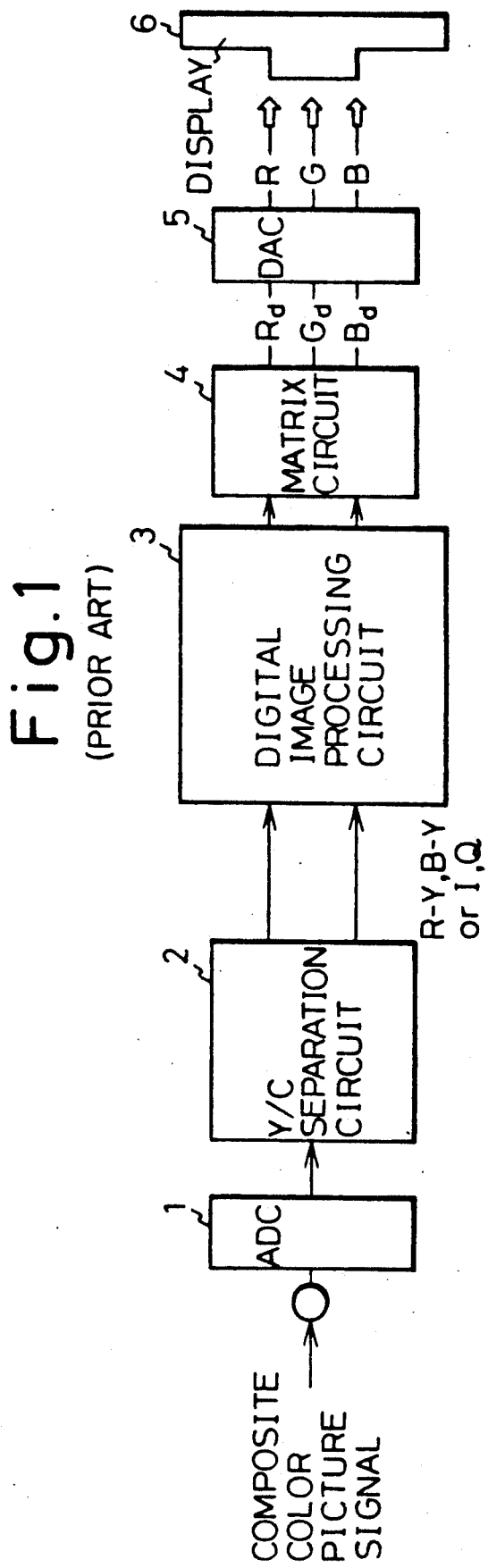
FIG. 1 shows an outline of a conventional construction of a color image display control apparatus.
Figures 2A, 2B:
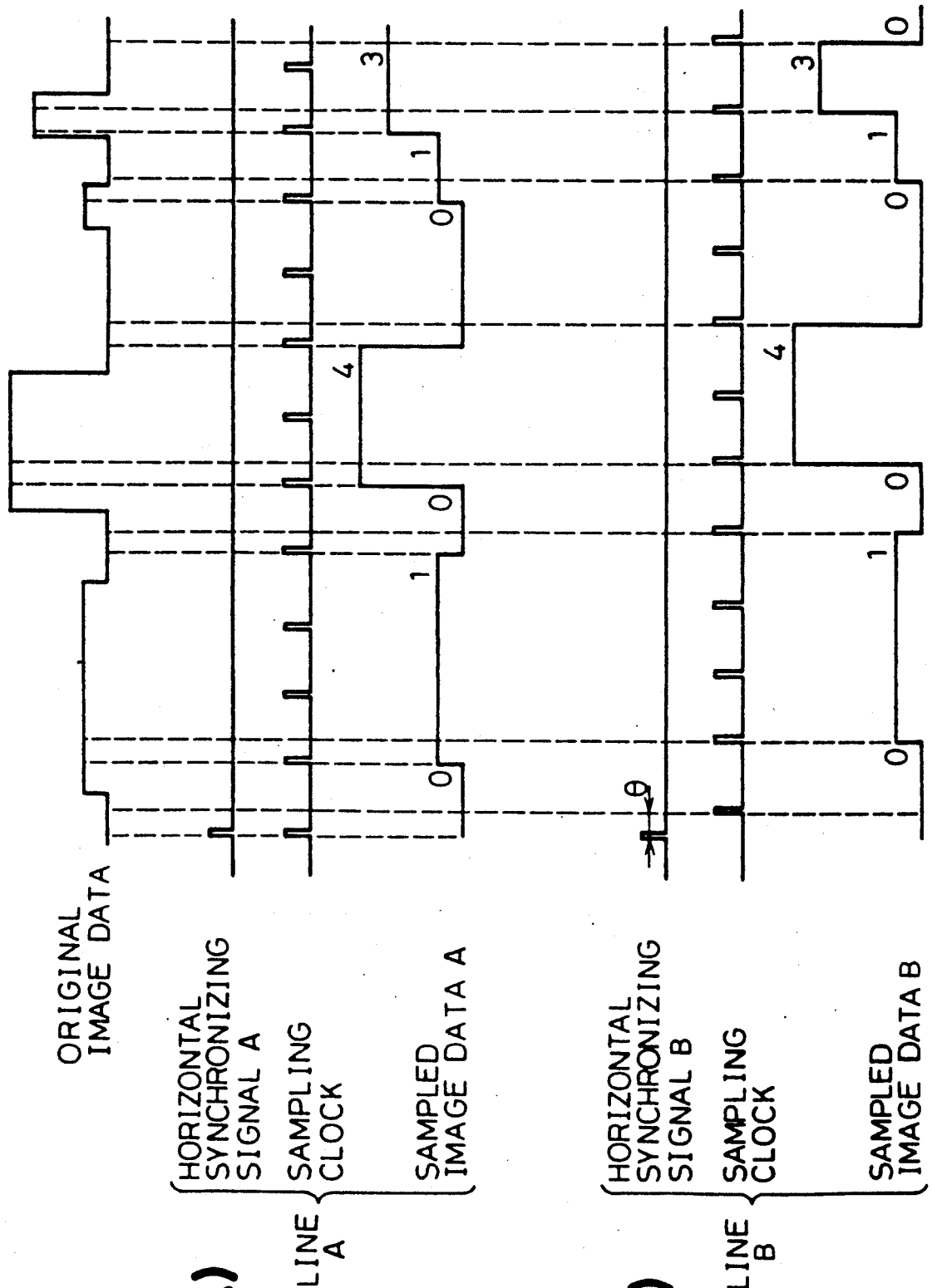
FIGS. 2(A) and 2(B) show a variation of phases of sampled image data according to a variation of phase differences between a horizontal synchronizing signal and a sampling clock, which variation results in dislocation of image data in the horizontal direction on a display screen.
Figure 3:
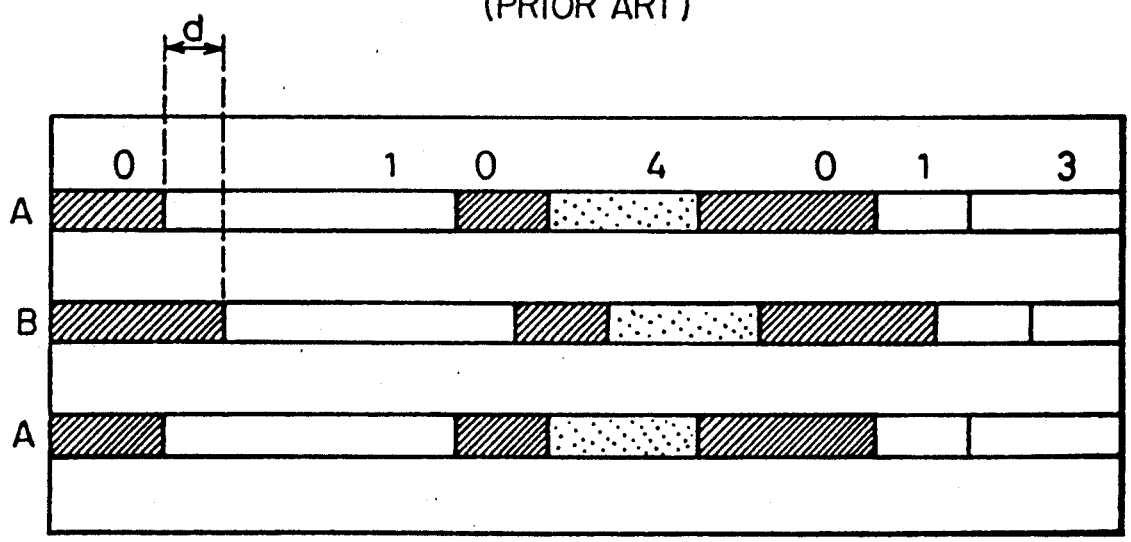
FIG. 3 illustrates a distortion of an image caused by the difference between the horizontal synchronizing signal and the sampling clock shown in FIG. 2.

The components except the sampled data modifying circuit 16 in FIG. 4, constitute a conventional color image display control apparatus, as shown in FIG. 1. Namely, the components in FIG. 4 denoted by the same as or similar to references as in FIG. 1, each operate basically the same as the corresponding one in FIG. 1. The memory circuit 17 and the memory control circuit 18 are included in the digital image processing circuit 3 in FIG. 1. The other components shown in FIG. 4 are not shown in the outline diagram, FIG. 1.

The horizontal synchronizing signal separation control circuit 12 separates the horizontal synchronizing signal (denoted by "H" in FIG. 4) from a received composite color picture signal.

The burst lock PLL circuit 13 generates a sampling clock synchronized with a color burst signal in the received composite color picture signal by a PLL construction.

The color demodulation circuit 15 demodulates a color components, which has been separated from a composite color picture signal in a digital form, in the Y/C separation circuit 14, and generates color difference signals $R-Y$ and $B-Y$ (or I and Q).

The digital image data which is to be processed is first written in the memory circuit 17, and then the data is processed on the memory circuit 17 by computer control (not shown) through the memory control circuit 18.

The aforementioned characteristic feature of the present invention is realized in the sampled data modifying circuit 16 in FIG. 4.

Figure 5:
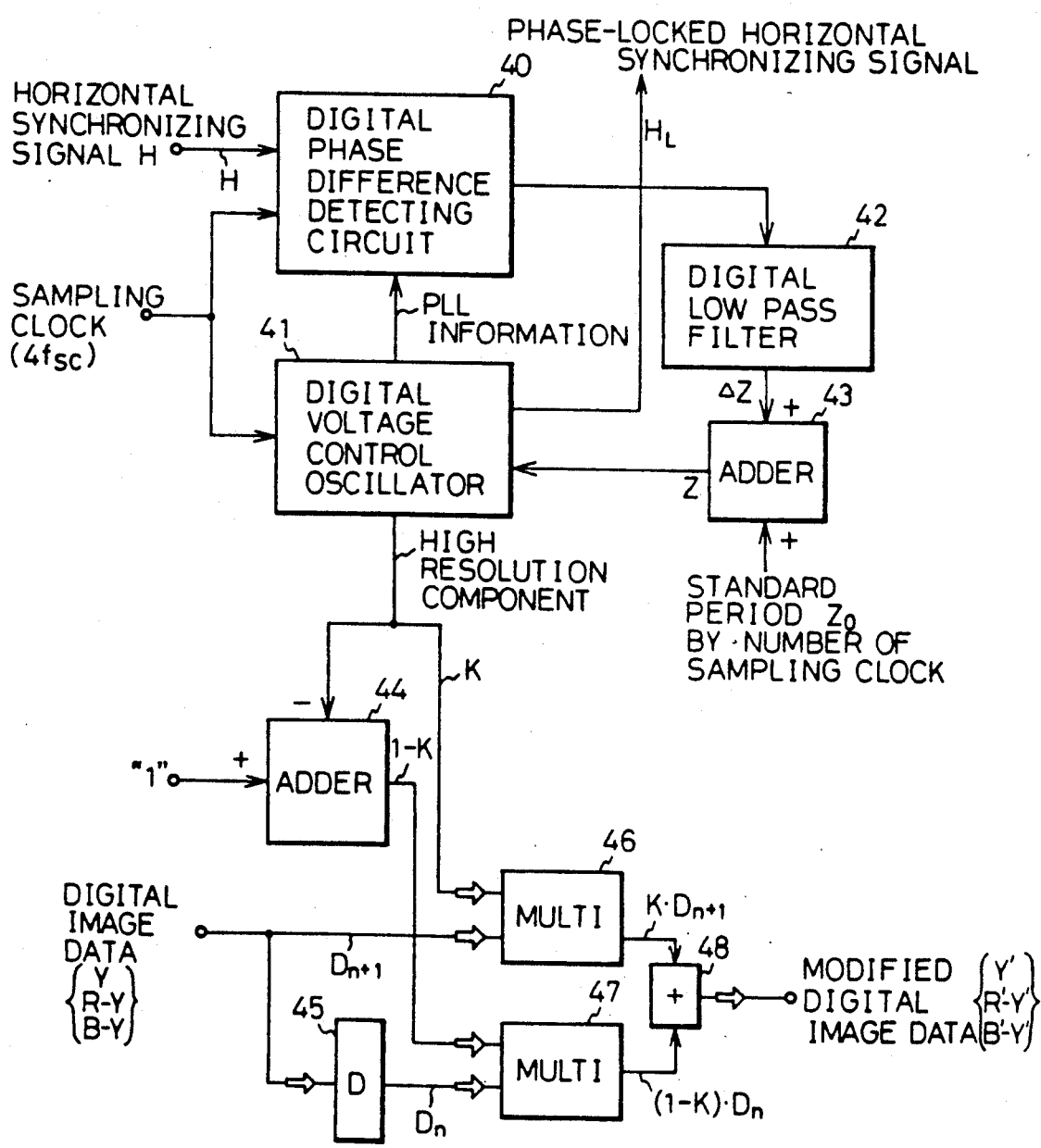
FIG. 5 shows the construction of the sampled data modifying circuit 16 of FIG. 4 in the preferred embodiment of the present invention.

FIG. 5 shows the construction of the above sampled data modifying circuit 16 in the preferred embodiment of the present invention.

In FIG. 5, reference numeral 40 denotes a digital phase difference detecting circuit, 41 denotes a digital voltage control oscillator, 42 denotes a digital low pass filter, 43, 44 and 48 each denote an adder circuit, 45 denotes a delay circuit, and 46 and 47 each denotes a multiplier circuit.

The digital phase difference detecting circuit 40, the digital voltage control oscillator 41, the digital low pass filter 42, and the adder circuit 43, constitute a digital PLL circuit which generates a phase-locked horizontal synchronizing signal $H_L$ and the aforementioned ratio of the phase difference to the cycle time of the sampling clock, i.e., the weight for the digital image data at the aforementioned adjacent cycle in the weighted average operation.

The phase-locked horizontal synchronizing signal $H_L$ is generated by a phase-locked loop operation so that the phase of the signal is controlled to track the horizontal synchronizing signal obtained in the horizontal synchronizing signal separating circuit 12 shown in FIG. 4.

The digital phase difference detecting circuit 40 detects the phase difference between the phase-locked horizontal synchronizing signal $H_L$ and the horizontal synchronizing signal H in a resolution higher than the cycle time of the sampling clock.

The digital low pass filter 42 eliminates a high frequency component from the output of the digital phase difference detecting circuit 40.

Although not shown, the digital voltage control oscillator 41 functions as a phase-locked horizontal synchronizing signal generating means and a high resolution portion outputting means.

In addition, the digital voltage control oscillator 41 and the adder circuit 43 function as a phase-locked horizontal synchronizing signal cycle time obtaining means.

The above phase-locked horizontal synchronizing signal cycle time obtaining means obtains a cycle time Z of the phase-locked horizontal synchronizing signal in a resolution higher than the cycle time of the sampling clock, based on the output of the digital low pass filter 42.

The above phase-locked horizontal synchronizing signal generating means generates a phase-locked horizontal synchronizing signal $H_L$ having a cycle time equal to the output of the above phase-locked horizontal synchronizing signal cycle time obtaining means at a resolution equal to the cycle time of the sampling clock.

The above high resolution portion outputting means outputs a high resolution component K of the phase difference between the output Z of the phase-locked horizontal synchronizing signal cycle time obtaining means and the above cycle time of the output the phase-locked horizontal synchronizing signal generating means, which component is smaller than the cycle time of the sampling clock, and has a resolution higher than the cycle time of the sampling clock.

The above high resolution component K of the phase difference corresponds to the aforementioned ratio of the phase difference to a cycle time of the sampling clock, i.e., the weight for the digital image data at the adjacent cycle in the weighted average operation.

The construction shown in the lower portion of FIG. 5, is provided for carrying out the above-mentioned weighted average operation.

The above value K is used as a multiplier in the multiplier circuit 46.

In the multiplier circuit 47, the value $1-K$ is used as a multiplier, where the value is generated in the adder circuit 44.

The aforementioned digital (sampled) image data, for example, Y, R−Y, and B−Y is directly input into the multiplier circuit 46 as a multiplicand, and is also input into the multiplier circuit 47 as a multiplicand through the delay circuit 45. The delay time in the delay circuit 45 is equal to the cycle time of the sampling clock. In FIG. 5, $D_n$ or $D_{n+1}$ each denote digital image data sampled at the timing n or n+1.

Next, the outputs $KD_{n+1}$ and $(1-K)D_n$ of the multiplier circuits 46 and 47 are added in the adder circuit 48, and thus, the weighted average $D_n'=(1-K)D_n+KD_{n+1}$ is obtained as a modified data value for correcting a distortion in a displayed image.

The timing of the above operation is shown in FIGS. 6(A)–6(D).

As shown in FIGS. 6(A)–6(D), when the aforementioned ratio of the phase difference of the horizontal synchronizing signal from the preceding sampling clock, to the cycle time of the sampling clock is K, the image data corresponding to each cycle of the sampling clock is modified by the above equation.

According to the above modification, an abrupt distortion of a displayed image in the horizontal direction due to the variation of the phase difference between the horizontal synchronizing signal and the sampling clock, can be effectively smoothed, and the quality of the processed image is greatly improved.

Figure 7:
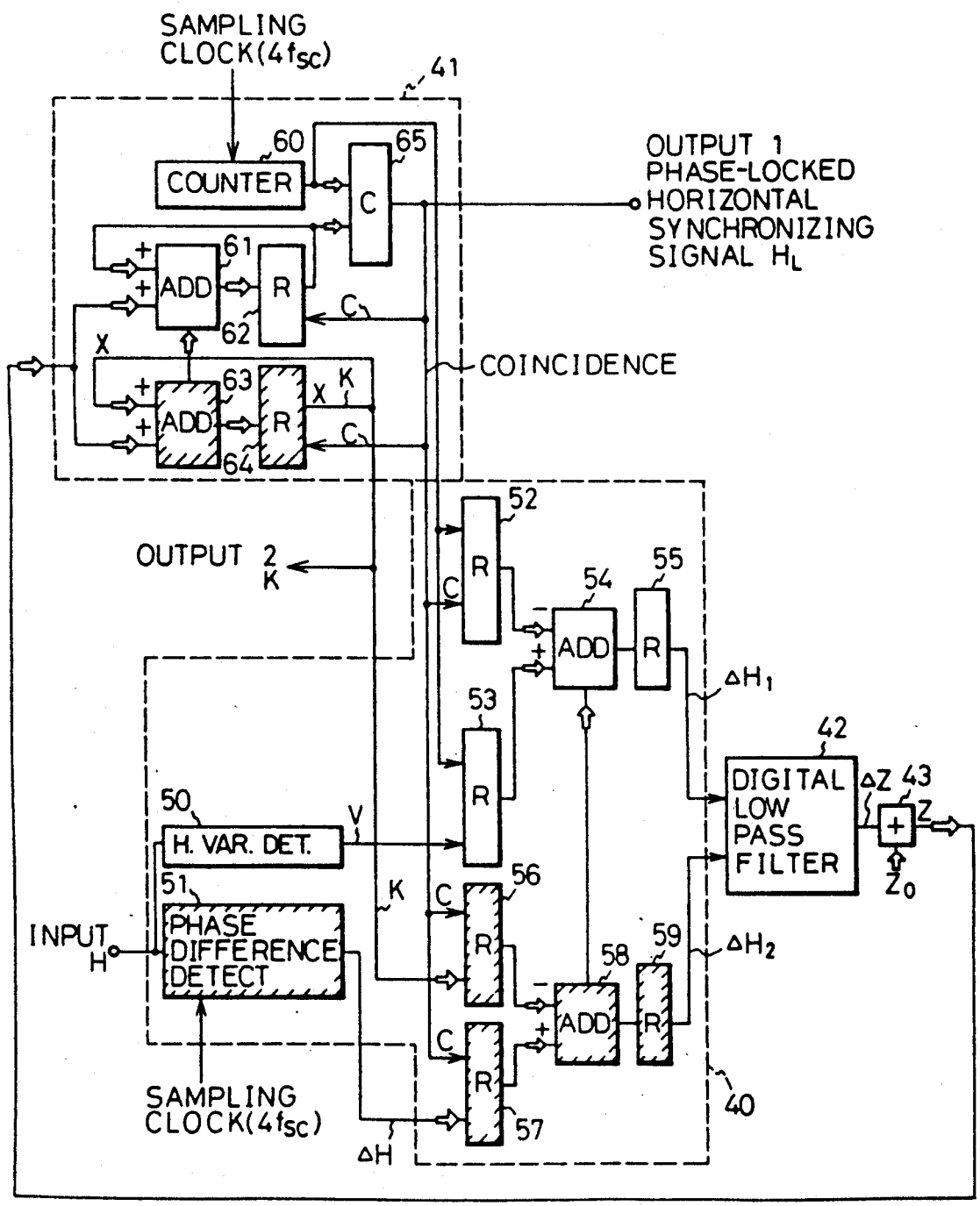
FIG. 7 shows an example of a concrete construction realizing the digital PLL circuit generating a phase-locked horizontal synchronizing signal and the ratio of the phase difference and the cycle time of the sampling clock.

FIG. 7 shows an example of a concrete construction realizing the above-mentioned digital PLL circuit generating a phase-locked horizontal synchronizing signal and the aforementioned ratio of the phase difference and the cycle time of the sampling clock.

In FIG. 7, reference numeral 50 denotes a horizontal synchronizing signal variation detecting circuit, 51 denotes a high resolution phase difference detecting circuit, 52, 53, 55, 56, 57, 59, 62, and 64 each denote a register, 54, 58, 61, and 63 each denote an adder circuit, 60 denotes a counter, and 65 denotes a comparator.

The horizontal synchronizing signal variation detecting circuit 50 detects a varying point (phase) of the horizontal synchronizing signal which has been separated in the aforementioned horizontal synchronizing signal separation circuit 12 from a received composite color picture signal.

The high resolution phase difference detecting circuit 51 detects a phase difference between the above horizontal synchronizing signal and the sampling clock, in a resolution finer than the cycle time of the sampling clock.

The counter 60 simply counts the sampling clock.

The adder circuit 61 adds an integer portion of the output Z of the adder circuit 43, i.e., a portion of the output Z of the adder circuit 43 having a resolution equal to the cycle time of the sampling clock, to the output of the register 62, when the register 62 receives a coincidence signal C, which is used as a phase-locked horizontal synchronizing signal $H_L$.

Similarly, the adder circuit 63 adds a decimal portion of the output Z of the adder circuit 43, i.e., a portion of the output Z of the adder circuit 43 having a resolution higher than the cycle time of the sampling clock, to the output of the register 64, when the register 64 receives a coincidence signal C (a phase-locked horizontal synchronizing signal $H_L$). The output of the register 64 corresponds to the aforementioned high resolution component K of the phase difference between the output Z of the phase-locked horizontal synchronizing signal cycle time obtaining means and the above cycle time of the output the phase-locked horizontal synchronizing signal generating means having a resolution higher than the cycle time of the sampling clock, i.e., the ratio K of the phase difference of the horizontal synchronizing signal from the preceding sampling clock, to the cycle time of the sampling clock.

The comparator 65 detects a coincidence of the output of the counter 60 and the output of the register 62, and outputs a coincidence signal C, i.e., a phase-locked horizontal synchronizing signal $H_L$ when a coincidence is detected.

The register 52 inputs the output of the counter 65 when the coincidence signal C is applied.

The register 53 inputs the output of the counter 65 when the variation of the horizontal synchronizing signal H is detected in the horizontal synchronizing signal variation detecting circuit 50.

The register 56 inputs the output of the register 64 when the coincidence signal C is applied.

The register 57 inputs the output ΔH of the phase difference detecting circuit 51 when the coincidence signal C is applied.

The difference of the output of the register 53 from the output of the register 52 is calculated in the adder circuit 54, and the result $\Delta H_1$ is held in the register 55.

Similarly, the difference of the output of the register 57 from the output of the register 56 is calculated in the adder circuit 58, and the result $\Delta H_2$ is held in the register 59.

The above difference $\Delta H_1$ indicates a difference of the cycle time of the horizontal synchronizing signal H from the phase-locked horizontal synchronizing signal $H_L$ in the resolution equal to the cycle time of the sampling clock.

Similarly, the above difference $\Delta H_2$ indicates a decimal portion (having a resolution equal to the output of the phase difference detecting circuit 51 or the output of the adder circuit 43, which is finer than the cycle time of the sampling clock) of the difference of the cycle time of the horizontal synchronizing signal H from the phase-locked horizontal synchronizing signal $H_L$ in the resolution equal to the cycle time of the sampling clock. In other words, the difference $\Delta H_2$ is a remainder portion of the difference of the cycle time of the horizontal synchronizing signal H from the phase-locked horizontal synchronizing signal $H_L$ in the resolution finer than the cycle time of the sampling clock, which cannot be counted as the integer difference $\Delta H_1$.

Both the differences $\Delta H_1$ and $\Delta H_2$ are input into the digital low pass filter 42, and the low frequency component $\Delta Z$ of the sum of the differences $\Delta H_1$ and $\Delta H_2$ is output from the digital low pass filter 42. The output $\Delta Z$ is input into the adder circuit 43, and then is added to the value $Z_0$ of the standard cycle time of the horizontal synchronizing signal which is measured by using the cycle time of the sampling clock as a unit, to generate the aforementioned cycle time Z of the phase-locked horizontal synchronizing signal $H_L$ in a resolution finer than the cycle time of the sampling clock.

Figure 8:
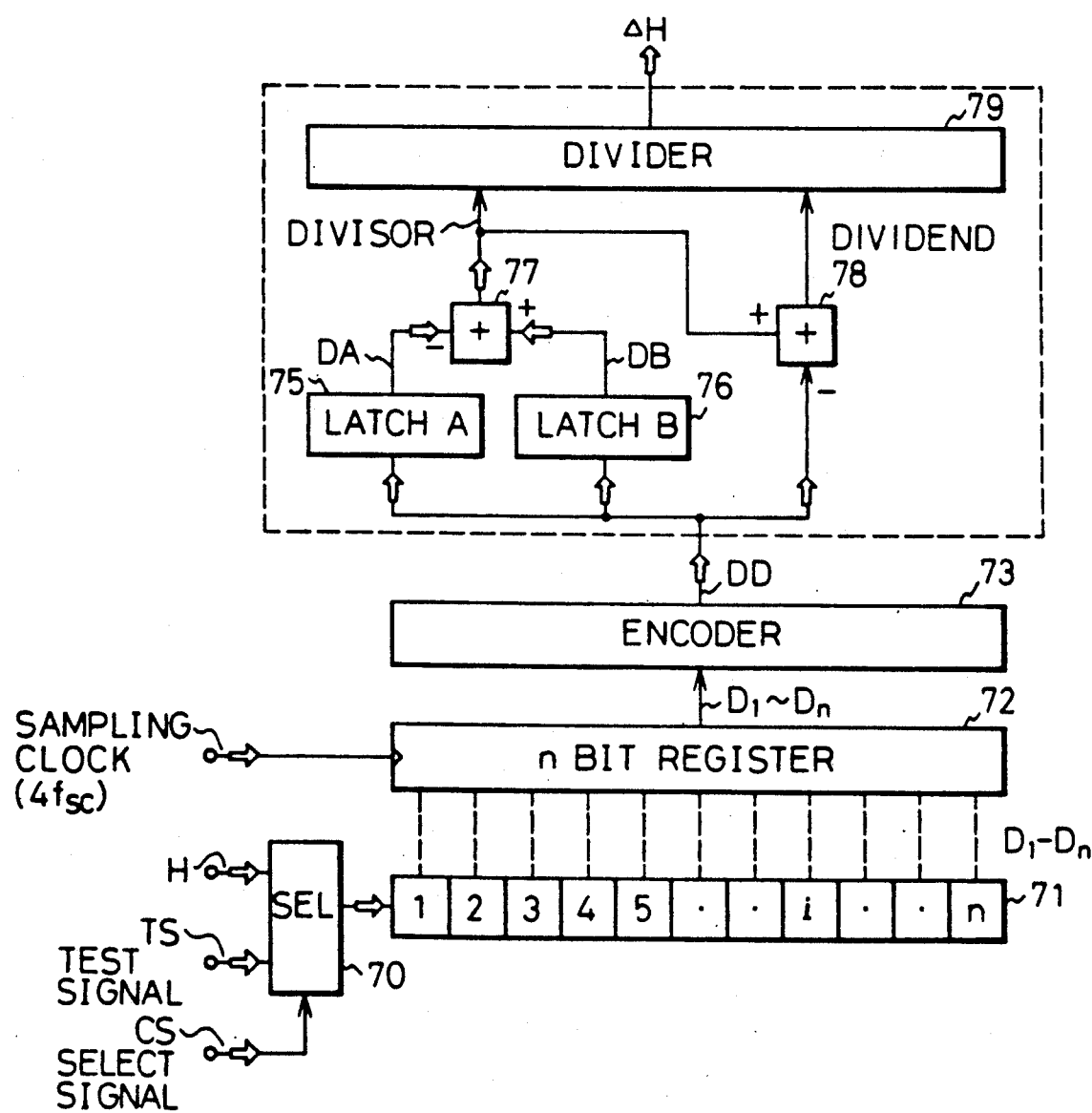
FIG. 8 shows an example of a concrete construction realizing the high resolution phase difference detecting circuit 51.

FIG. 8 shows an example of a concrete construction realizing the above high resolution phase difference detecting circuit 51.

In FIG. 8, reference numeral 70 denotes a selector, 71 denotes an n-stage delay circuit, 72 denotes an n bit register, 73 denotes an encoder, 75 and 76 each denote a latch circuit, 77 and 78 each denote an adder circuit, and 79 denotes a divider circuit.

The selector 70 receives a test signal TS during a test, and receives the horizontal synchronizing signal H during a normal operation, under the control of a select control signal CS. When the select control signal CS is at "H" level, the selector 70 selects the test signal TS, and when the select control signal is at "L" level, the selector 70 selects the horizontal synchronizing signal H. The output of the selector 70 is input into a serial input terminal of the n-stage delay circuit 71.

The n-stage delay circuit 71 is constituted by a series of delay elements (for example, buffer circuits formed in a small area of a semiconductor chip) denoted by "1", "2", . . . "n", where each of the delay elements has substantially the same delay time.

The output of each delay element is applied to a corresponding input terminal of the n bit register.

The n bit register 72 inputs the above outputs of the delay elements of the n-stage delay circuit 71 in parallel at each leading edge of the sampling clock. The output of the n bit register 73 $D_1$, . . . $D_n$ is input into the encoder 73, and the first output DD of the encoder 73 during the test situation is latched in the latch circuit A 75, and the second output DD of the encoder 73 is latched in the latch circuit B 76. The outputs of the latch circuits 75 and 76 are added in the adder circuit 77, and the added result is input into the divider circuit 79 as a divisor.

In a normal operation, when a leading edge of the horizontal synchronizing signal H is input into the n-stage delay circuit 71 through the selector 70, the output of each delay element of the n-stage delay circuit 71 is latched in a corresponding one bit of the n bit register 72 at the timing of the next leading edge of the sampling clock. The output $D_1$, . . . $D_n$ of the n bit register 72 is encoded to a signal DD in the encoder 73, and then is used as a subtrahend in the adder circuit 78. The output of the adder circuit 77 is used as a minuend in the adder circuit 78. The output of the adder circuit 78 is input into the divider circuit 79 as a dividend.

The divider circuit 79 carries out a dividing operation using the above dividend and the divisor. The divisor indicates the value of the cycle time of the sampling clock, measured using the above-mentioned delay time of each delay element of the n-stage delay circuit 71 as a unit, and the above subtrahend in the adder circuit 78 indicates the value of the phase difference from the timing of the leading edge of the horizontal synchronizing signal to the next leading edge (shown by $SC_3$ in FIG. 10) of the sampling clock, measured using the above-mentioned delay time of each delay element of the n-stage delay circuit 71 as a unit.

Therefore, the dividend indicates the value of the phase difference from the leading edge preceding to the above leading edge $SC_3$ of the sampling clock to the timing of the above leading edge of the horizontal synchronizing signal, measured using the above-mentioned delay time of each delay element of the n-stage delay circuit 71 as a unit.

Thus, the output ΔH of the divider circuit 79 is equal to a ratio of the phase difference from the leading edge preceding to the above leading edge $SC_3$ of the sampling clock to the timing of the above leading edge of the horizontal synchronizing signal.

The timings of the operations of the high resolution phase difference detecting circuit of FIG. 8 are explained with reference to FIGS. 9 and 10.

Figure 9:
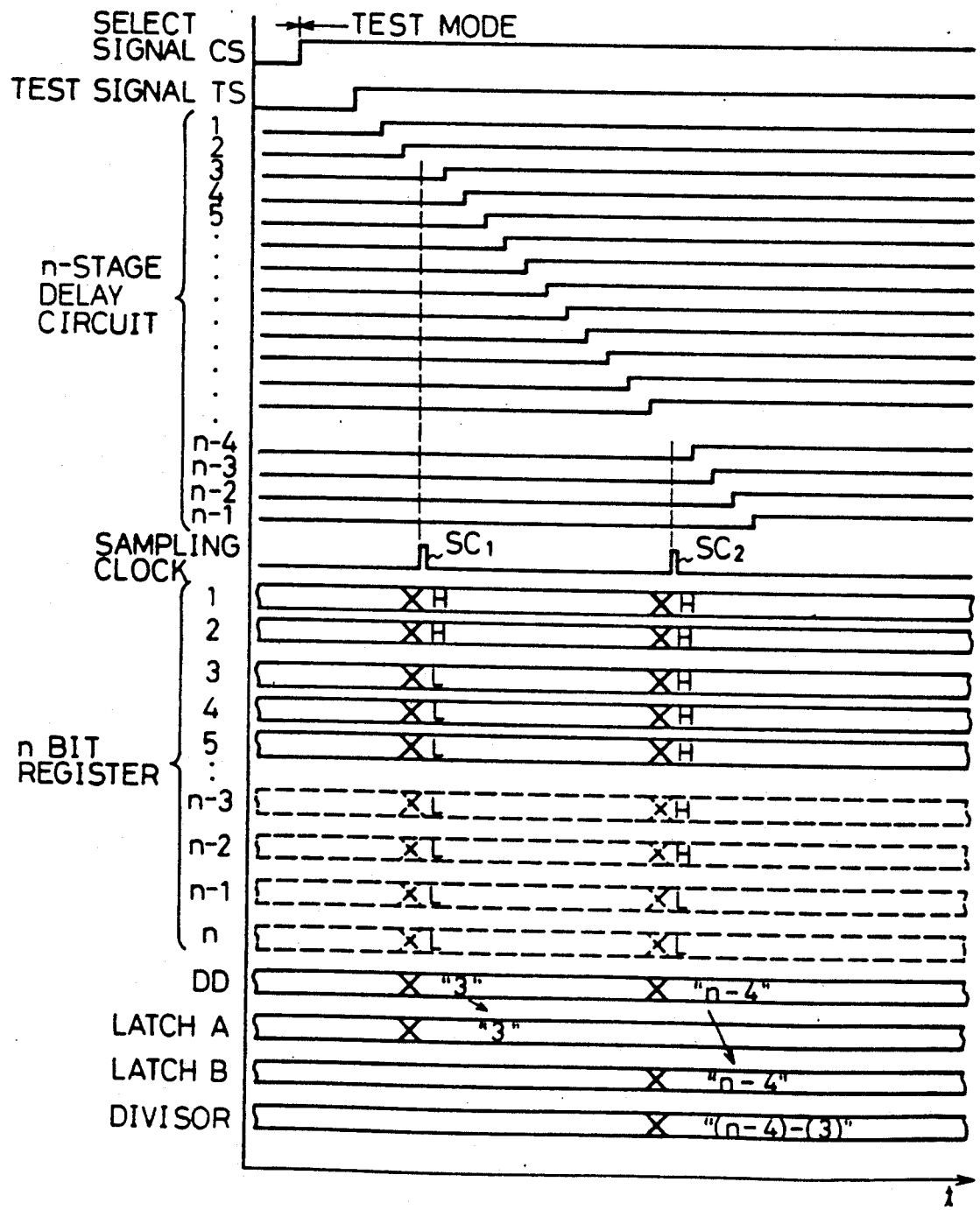
FIG. 9 shows an example of the timings of the operations of the high resolution phase difference detecting circuit of FIG. 8 during a test.

FIG. 9 shows an example of the timings of the operations of the high resolution phase difference detecting circuit 51 of FIG. 8 during a test.

In testing, first, the select control signal CS is set to "H" level as shown in the top of FIG. 9. Then, a leading edge of the test signal TS is input into the serial input terminal of the n-stage delay circuit 71. Accordingly, the leading edge transmits through each delay element of the n-stage delay circuit 71 with the aforementioned constant delay time. The timing of the transmission of the leading edge can be detected by the n bits of the outputs of the delay elements, and the n bit output of the n-stage delay circuit 71 indicating "3" is latched in the n bit register 72 at the timing of the first leading edge of the sampling clock ($SC_1$ in FIG. 9) in this example. The n bit register 72 latches the n bit output of the n-stage delay circuit 71 indicating "n−4" is latched again in the n bit register 72 at the next leading edge of the sampling clock (shown by $SC_2$ in FIG. 9).

As mentioned above, the above value "3" is latched in the latch circuit 75, and the above value "n−4" is latched in the latch circuit 76, and therefore, the value "n−4"−"3" is input into the divider 79 from the adder circuit 77 as the above divisor.

Figure 10:
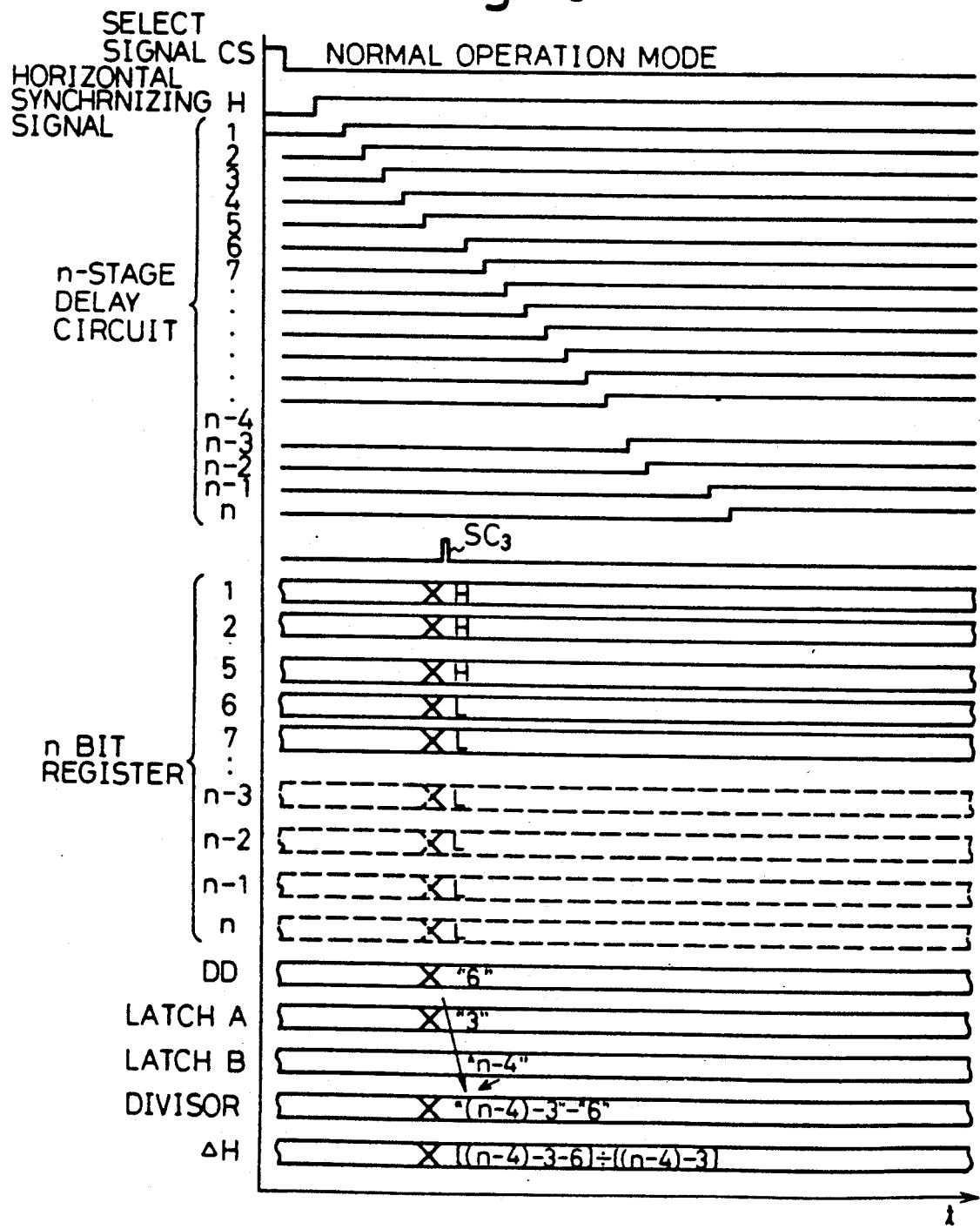
FIG. 10 shows an example of the timings of the operations of the high resolution phase difference detecting circuit of FIG. 8 during a normal operation.

FIG. 10 shows an example of the timings of the operations of the high resolution phase difference detecting circuit 51 of FIG. 8 during a normal operation.

In the normal operation, first, the select control signal CS is set to "L" level as shown in the top of FIG. 10.

When, a leading edge of the horizontal synchronizing signal H is input into the serial input terminal of the n-stage delay circuit 71, similar to the above-mentioned test operation, the leading edge transmits through each delay element of the n-stage delay circuit 71 with the aforementioned constant delay time. Then, at the timing of a next leading edge $SC_3$ of the sampling clock, the n bit output of the n-stage delay circuit 71, indicating "6" in this example, is latched in the n bit register 72. As mentioned above, this latched value "6" is encoded in the encoder 73, and then is used as a subtrahend in the adder circuit 78. As the minuend in the adder circuit 78 is equal to the above "(n−4)−3", the dividend in the divider 79 is "(n−4)−3−6" as shown in FIG. 10, and thus the output ΔH of the divider circuit 79 is [(n−4)−3−6]÷[(n−4)−3] as shown in FIG. 10.

Thus, the high resolution phase difference detecting circuit 51 detecting a phase difference between the above horizontal synchronizing signal H and the sampling clock in a resolution finer than the cycle time of the sampling clock, is realized by the construction of FIG. 8.

Figure 11:
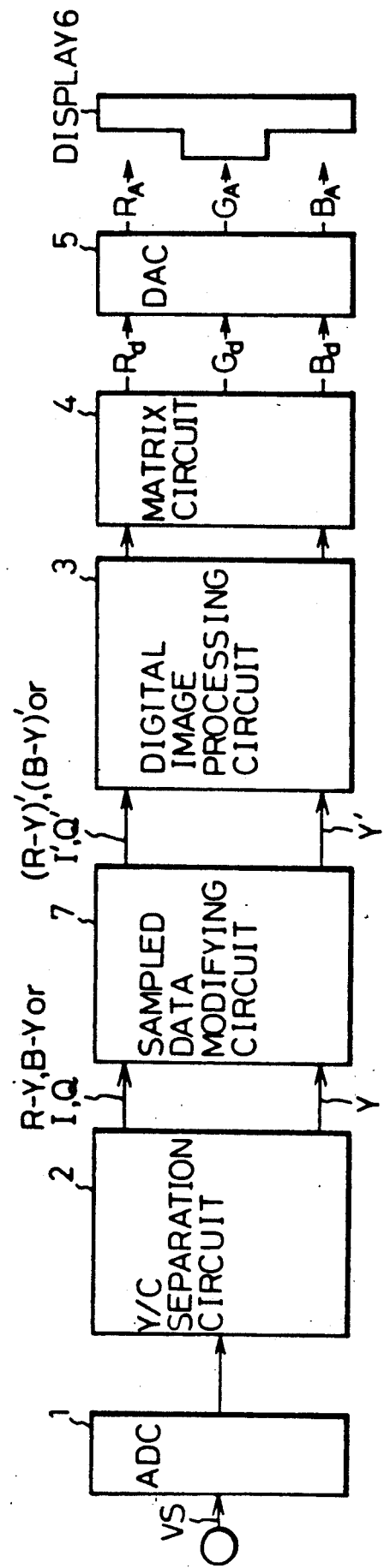
FIGS. 11 to 13 show three possible variations in arrangement of the components of color image display control apparatus according to the present invention.
Figure 12:
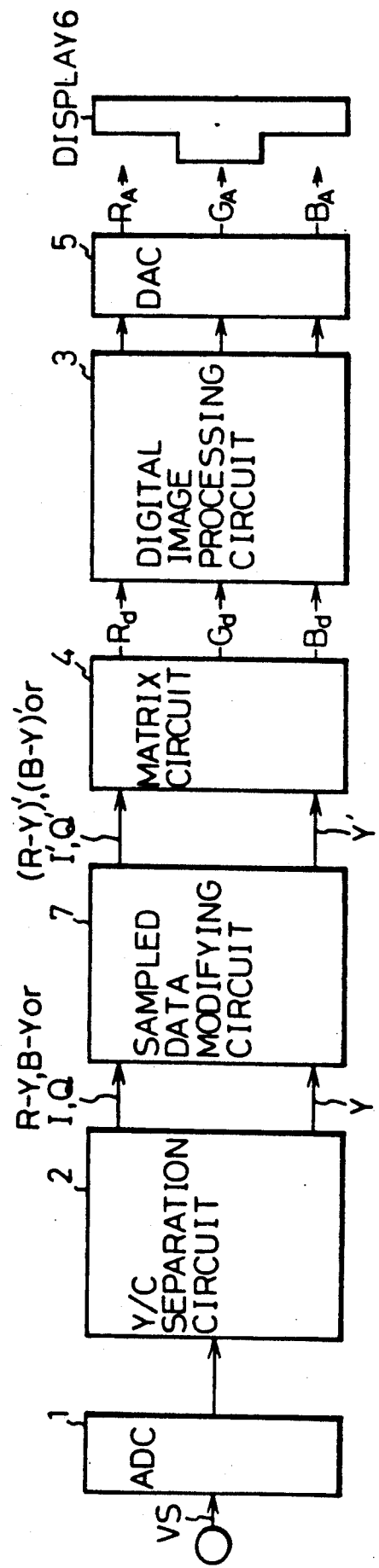
Figure 13:
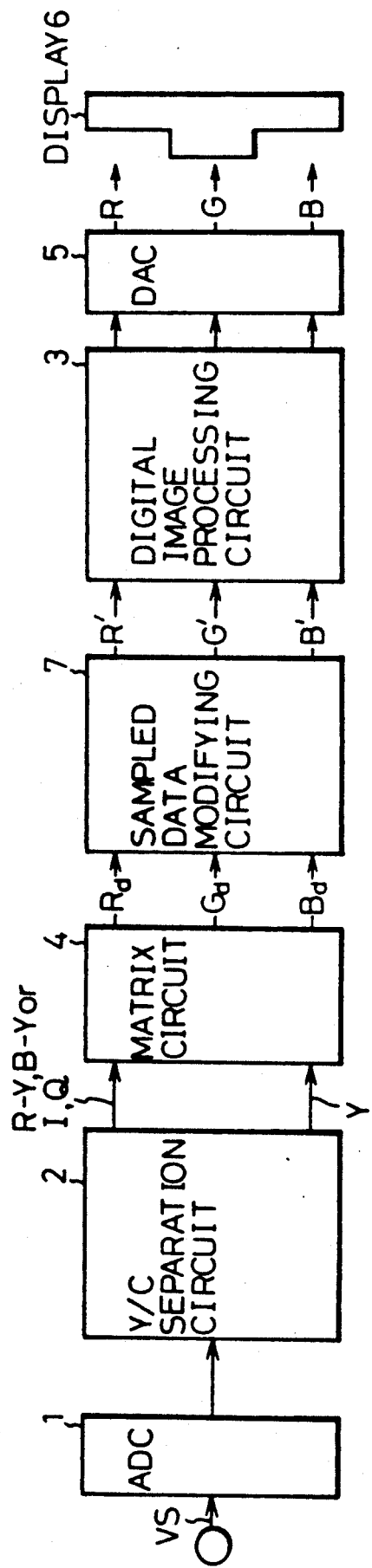

FIGS. 11 to 13 provides three possible variations in arrangement of the components of color image display control apparatus according to the present invention.

The arrangement shown in FIG. 11, is the same as the aforementioned construction of FIG. 4.

In FIG. 11, the Y/C separation circuit 2 and the matrix circuit 4 are provided in previous stages of the digital image processing circuit 3, and the digital data modifying circuit 7 according to the present invention is provided between the matrix circuit 4 and the digital image processing circuit 3.

In the arrangement shown in FIG. 12, the Y/C separation circuit 2 and the matrix circuit 4 are provided in previous stages of the digital image processing circuit 3, and the digital data modifying circuit 7 according to the present invention is provided between the Y/C separation circuit 2 and the matrix circuit 4.

In the arrangement shown in FIG. 13, the Y/C separation circuit 2 is provided in a previous stage of the digital image processing circuit 3, the matrix circuit 4 is provided in a following stage of the digital image processing circuit 3, and the digital data modifying circuit 7 according to the present invention is provided between the Y/C separation circuit 2 and the digital image processing circuit 3.

Generally, it is known that, holding image data in the image processing circuit in an RGB form, reduces the load on the computer control, or holding image data in the image processing circuit in the form of Y, R−Y, and B−Y, or I and O, reduces the memory area in the image processing circuit.

What is claimed is:

1. A color image display control apparatus for receiving a composite color picture signal and processing color image data included in the signal, comprising:

an analog to digital converter for converting a color picture signal in an analog form included in the composite color picture signal to a digital form by sampling the analog signal at each cycle of a sampling clock;

digital image processing means for processing digital image data;

a digital to analog converter for converting said processed digital image data to an analog form;

phase difference information outputting means for outputting information regarding a phase difference between one of a leading edge and trailing edge of said sampling clock and one of a leading edge and trailing edge of each analog horizontal synchronizing signal in said composite color picture signal; and digital data modifying means for modifying said digital image data in a line corresponding to said each horizontal synchronizing signal, which was sampled by said sampling clock, according to said information, so that a distortion due to said phase difference is corrected, in an image of said digital image data which is to be processed in said digital imaging processing means.

2. A color image display control apparatus according to claim 1, wherein said digital data modifying means comprises a weighted average obtaining means for obtaining a weighted average of said digital image data which is generated in said analog to digital converter at each cycle and at a next cycle of said each cycle, according to said information, to replace said digital image data with said weighted average.

3. A color image display control apparatus according to claim 2, wherein said weighted average obtaining means uses a ratio of said phase difference and a cycle time of said sampling clock as a weight for obtaining said weighted average.

4. A color image display control apparatus according to claim 2, wherein said phase difference information outputting means having digital PLL means for generating a phase-locked horizontal synchronizing signal the phase of which is controlled to follow-up said horizontal synchronizing signal by a phase-locked loop operation, comprising:

phase difference detecting means for detecting the phase difference between one of a leading edge and trailing edge of said horizontal synchronizing signal and one of a leading edge and trailing edge of said phase-locked horizontal synchronizing signal in a resolution higher than the cycle time of said sampling clock;

a digital low pass filter for eliminating a high frequency component from the output of said phase difference detecting means;

phase-locked horizontal synchronizing signal cycle time obtaining means for obtaining a cycle time of said phase-locked horizontal synchronizing signal, in a resolution finer than the cycle time of said sampling clock, based on the output of said digital low pass filter;

phase-locked horizontal synchronizing signal generating means for generating a phase-locked horizontal synchronizing signal having a cycle time equal to the output of said phase-locked horizontal synchronizing signal cycle time obtaining means in a resolution equal to the cycle time of said sampling clock; and high resolution portion outputting means for outputting a high resolution component of the phase difference between said output of said phase-locked horizontal synchronizing signal cycle time obtaining means and the cycle time of the output of said phase-locked horizontal synchronizing signal generating means, which component is smaller than the cycle time of the sampling clock, and has in a resolution finer than the cycle time of said sampling clock.

5. A color image display control apparatus according to claim 4, wherein the output of said high resolution portion outputting means is used for a weight for said digital image data at said neighboring cycles in said weighted average.

6. A color image display control apparatus according to claim 1, wherein said digital data modifying means comprises a weighted average of said digital image data which is generated in said analog to digital converter at each cycle and at a next cycle of said each cycle, according to said information to replace said digital image with said weighted average.

7. A color image display control apparatus according to claim 6, wherein said weighted average obtaining means uses a ratio of said phase difference and a cycle time of said sampling clock as a weight for obtaining said weighted average.

8. A color image display control apparatus according to claim 7, wherein said phase difference information outputting means having a digital PLL means for generating a phase-locked horizontal synchronizing signal the phase of which is controlled to follow-up said horizontal synchronizing signal by a phase-locked loop operation, comprising:

phase difference detecting means for detecting the phase difference between one of a leading edge and trailing edge of said horizontal synchronizing signal and one of a leading edge and trailing edge of said phase-locked horizontal synchronizing signal in a resolution higher than the cycle time of said sampling clock;

a digital low pass filter for eliminating a high frequency component from the output of said phase difference detecting means;

phase-locked horizontal synchronizing signal cycle time obtaining means for obtaining a cycle time of said phase-locked horizontal synchronizing signal, in a resolution finer than the cycle time of said sampling clock, based on the output of said digital low pass filter;

phase-locked horizontal synchronizing signal generating means for generating a phase-locked horizontal synchronizing signal having a cycle time equal to the output of said phase-locked horizontal synchronizing signal cycle time obtaining means in a resolution equal to the cycle time of said sampling clock; and high resolution portion outputting means for outputting a high resolution component of the phase difference between said output of said phase-locked horizontal synchronizing signal cycle time obtaining means and the cycle time of the output of said phase-locked horizontal synchronizing signal generating means, which component is smaller than the cycle time of said sampling clock, and has a resolution finer than the cycle time of said sampling clock.

9. A color image display control apparatus according to claim 8, wherein the output of said high resolution portion outputting means is used for a weight for said digital image data at said adjacent cycle in said weighted average.

10. A color image display control apparatus according to claim 1, further comprising:
Y/C separation mans for separating a luminance signal and color difference signals from the output signal of said analog to digital converter; and
matrix means for composing color signals from said luminance signal and said color difference signals; wherein
said Y/C separation means and said matrix means are provided in previous stages of said digital image processing means, and said digital data modifying means is provided between said matrix means and said digital image processing means.

11. A color image display control apparatus according to claim 1, further comprising:
Y/C separation means for separating a luminance signal and color difference signals from the output signal of said analog to digital converter; and
matrix means for composing color signals from said luminance signal and color difference signals; wherein
said Y/C separation means and said matrix means are provided in previous stages of said digital image processing means, and said digital data modifying means is provided between said Y/C separation means and said matrix means.

12. A color image display control apparatus according to claim 1, further comprising:
Y/C separation means for separating a luminance signal and said color difference signals from the output signal of said analog to digital converter; and
matrix means for composing color signals from said luminance signal and said color difference signals; wherein
said Y/C separation means is provided in a previous stage of said digital image processing means, said matrix means is provided in a following stage of said digital image processing means, and said digital data modifying means is provided between said Y/C separation means and said digital image processing means.

* * * * *